United States Patent
Yang

(10) Patent No.: US 10,185,365 B2
(45) Date of Patent: Jan. 22, 2019

(54) ELECTRONIC DEVICE HAVING FLEXIBLE SCREEN

(71) Applicant: SHENZHEN ROYOLE TECHNOLOGIES CO. LTD., Shenzhen (CN)

(72) Inventor: Songling Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/521,394

(22) PCT Filed: Oct. 28, 2014

(86) PCT No.: PCT/CN2014/089743
§ 371 (c)(1),
(2) Date: Apr. 24, 2017

(87) PCT Pub. No.: WO2016/065542
PCT Pub. Date: May 6, 2016

(65) Prior Publication Data
US 2017/0308126 A1    Oct. 26, 2017

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01)

(58) Field of Classification Search
CPC .................................................... G03B 21/58
See application file for complete search history.

(56) References Cited

U.S. PATENT DOCUMENTS

| 4,390,054 A * | 6/1983 | Niibori .................. A01G 9/227 160/265 |
| 5,903,252 A | 5/1999 | Ogata |
| 6,105,290 A | 8/2000 | Coates et al. |
| 2013/0222293 A1 | 8/2013 | Chung |

(Continued)

FOREIGN PATENT DOCUMENTS

| CN | 101420524 A | 4/2009 |
| CN | 202979051 U | 6/2013 |

(Continued)

OTHER PUBLICATIONS

The extended European search report dated May 2, 2018 from corresponding application No. EP 14905189.8.

*Primary Examiner* — Christopher E Mahoney
(74) *Attorney, Agent, or Firm* — Hauptman Ham, LLP

(57) ABSTRACT

An electronic device has a front surface, a rear surface opposite to the front surface, and a first lateral surface connecting the front surface and the rear surface. The electronic device includes a first spindle, the flexible screen, and a functional element. The first spindle is rotatably provided at the first lateral surface, and can be rotated between a first position and a second position. The flexible screen is bent around the first spindle and can move as the first spindle is rotated. The functional element is provided at the first spindle. At the first position, the functional element faces the first lateral surface; at the second position, the functional element faces the front surface.

19 Claims, 5 Drawing Sheets

(56) References Cited

U.S. PATENT DOCUMENTS

| | | | |
|---|---|---|---|
| 2014/0028596 A1* | 1/2014 | Seo | G06F 3/0487 345/173 |
| 2014/0267950 A1 | 9/2014 | Kang et al. | |
| 2016/0209879 A1* | 7/2016 | Ryu | G06F 1/1601 |
| 2017/0064847 A1* | 3/2017 | Lim | G09F 9/00 |
| 2017/0318688 A1* | 11/2017 | Kim | H05K 5/0017 |

FOREIGN PATENT DOCUMENTS

| | | | |
|---|---|---|---|
| CN | 103680319 A | | 3/2014 |
| EP | 1724997 A | | 11/2006 |
| JP | 55150055 A | * | 11/1980 |
| JP | S55150055 A | | 11/1980 |
| JP | 2002032186 A | | 1/2002 |
| JP | 2005102149 A | | 4/2005 |
| JP | 2007072375 A | | 3/2007 |
| KR | 1020130099449 A | | 9/2013 |
| KR | 1020140059274 A | | 5/2014 |
| WO | 2009148313 A1 | | 12/2009 |

* cited by examiner

US 10,185,365 B2

ELECTRONIC DEVICE HAVING FLEXIBLE SCREEN

TECHNICAL FIELD

The present disclosure relates to electronic devices having flexible screens, and particularly to an electronic device having a flexible screen with a high screen proportion.

BACKGROUND ART

At present, handheld electronic devices such as cellphones and tablet computers tend to be developed towards a higher screen proportion (proportion accounted by a screen on a front panel). For instance, taking the cellphones as an example, GOA technology has been developed in order to reduce the width of a frame at both left and right sides of a front panel of the cellphone. As to both upper and lower sides of the front panel, in order to realize some current mainstream functions, such as self-timer, automatic screen-off during talking, automatically adjusting the brightness of the cellphone screen and other functions, corresponding functional elements such as a front-facing camera, a distance sensing means, a brightness sensing means and an earphone still have to be provided on the front panel, therefore, some positions of the front panel are undoubtedly occupied. In recent years, appearance of the flexible display screen provides a space for further increasing the screen proportion.

SUMMARY OF THE INVENTION

Embodiments of the present disclosure provide an electronic device having a flexible screen with a high screen proportion.

An electronic device having a flexible screen has a front surface, a rear surface opposite to the front surface and a first lateral surface connecting the front surface and the rear surface. The electronic device includes a first spindle, the flexible screen and a functional element. The first spindle is rotatably provided at the first lateral surface, and can be rotated between a first position and a second position. The flexible screen is bent around the first spindle and can move as the first spindle is rotated. The functional element is provided at the first spindle. At the first position, the functional element faces the front surface; at the second position, the functional element faces the first lateral surface.

In the electronic device of the present disclosure described above, when the functional element such as a microphone needs to be used for talking, it can be rotated with the first spindle to the first position facing the front surface, at this point the electronic device can be used in a way the same as the existing way. When use of a functional module is not needed, for example, when browsing the web, it can be rotated with the first spindle to the second position facing the lateral surface, at this point the position in the prior art for placing the functional module is occupied by the flexible screen, therefore, the proportion accounted by the screen of the electronic device is increased.

BRIEF DESCRIPTION OF THE DRAWINGS

The following drawings are intended to illustrate various embodiments of the present disclosure in detail in combination with specific embodiments. It is to be understood that various elements shown in the drawings are not representative of actual sizes or scaling relationship, but are merely schematic views shown for clear illustration, and shall not to be construed as limiting the present disclosure.

DETAILED DESCRIPTION

In order to make the object, technical solutions and advantages of the present disclosure be clear, the following will further specifically illustrate the present disclosure in combination with various embodiments and the accompanying drawings. It shall be understood that the embodiments described herein are merely used to illustrate the present disclosure but not to limit the present disclosure.

Figure 1:
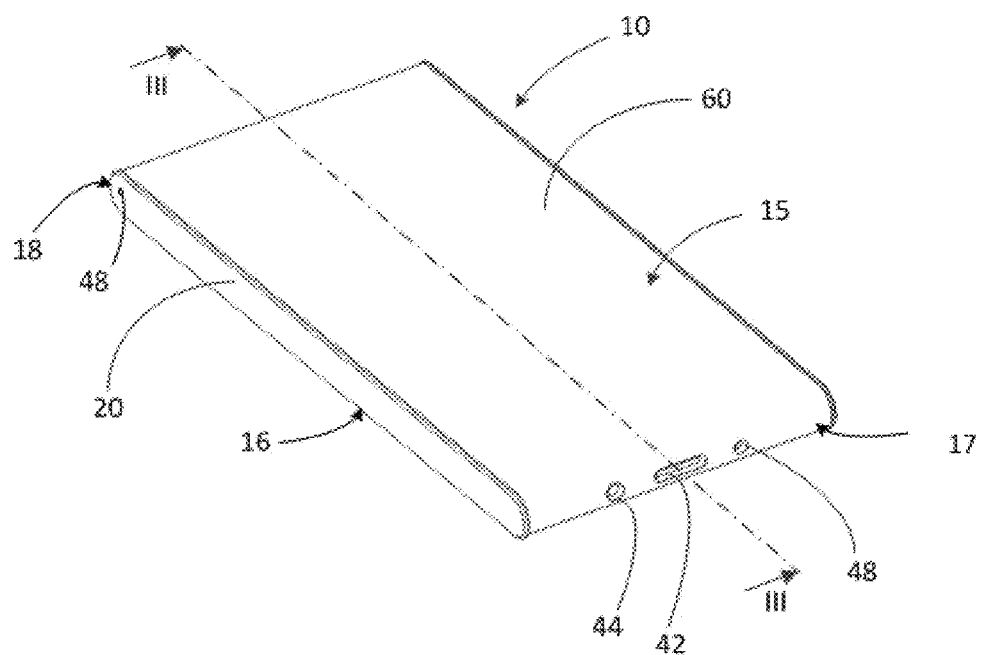
FIG. 1 is a schematic view of an electronic device having a flexible screen in accordance with a first embodiment of the present disclosure.
Figure 2:
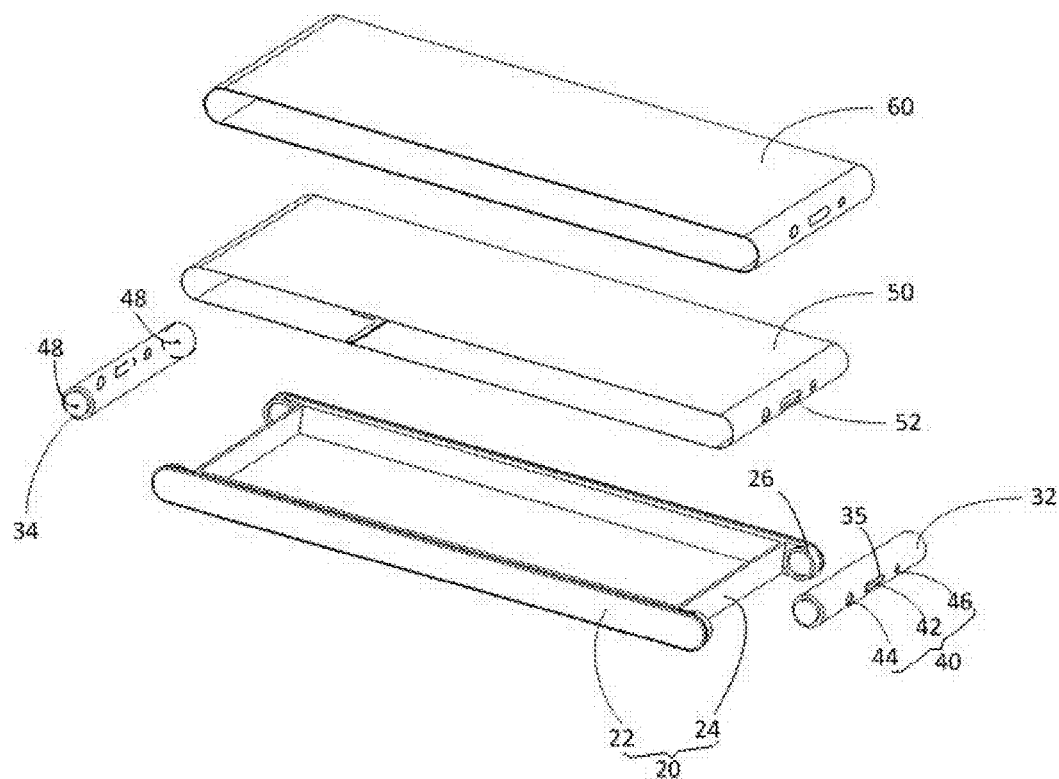
FIG. 2 is a partially exploded schematic view of the electronic device of FIG. 1.

In the following embodiments, an electronic device provided in the present disclosure is described by taking a cellphone as an example. Referring to FIG. 1 and FIG. 2, FIG. 1 and FIG. 2 are partially exploded structural views of an electronic device 10 after assembling and before assembling in accordance with a first embodiment of the present disclosure. In the views illustrated by FIG. 1 and FIG. 2, a surface of the electronic device 10 facing upward is defined as a front surface, a surface facing downward is defined as a rear surface, and a surface connecting the front surface and the rear surface is defined as a lateral surface. The electronic device 10 includes a frame 20, a first spindle 32, a second spindle 34, at least one functional element 40, a flexible screen 50, and a transparent protective layer 60.

The frame 20, substantially in a rectangular shape, includes two long frames 22 arranged opposite on long sides and connecting portions 24 connecting the two long frames 22. The long frames 22 are visible in the assembled electronic device 10, while the connecting portions 24 are invisible. In the present embodiment, the connecting portions 24 are shaped in strips parallel to each other, but it shall be understood that in other embodiments, the connecting portions 24 can also be plate-shape objects connecting the two long frames 22, so as to support or mount elements of the electronic device 10 such as a circuit board (not illustrated) and a cell (not illustrated). One of the long frames 22 is detachably connected to the connecting portions 24. Two opposite terminal ends of the two long frames 22 are provided with mounting portions 26 for mounting the first spindle 32 and the second spindle 34. The mounting portions 26 may be means facilitating rotation, such as bearings.

The first spindle 32, substantially in a cylindrical shape, has at least one through hole 35 provided on an axial surface thereof for mounting the functional element 40. In the present embodiment, the first spindle 32 is provided with three through holes, and the functional element 40 includes an earphone 42 and includes a photographing means 44 and a brightness sensing means 46 located at both sides of the earphone 42. Certainly, in other embodiments, other elements realizing specific functions, such as a distance sensing means and the like, can also be included, at this point, the number of the through hole 35 can be correspondingly set. The second spindle 34 is rotatably mounted to the other side of the frame 20 located opposite to the first spindle 32.

The flexible screen 50 is connected end to end, and the first spindle 32 and the second spindle 34 are closely supported inside the flexible screen 50, so that the flexible screen 50 is bent at the two spindles and can move as the spindles are rotated. Thus, a structure similar to a transmission band is formed. The flexible screen 50 is provide with perforations 52 at places directly facing the functional elements 40, so that the functional elements 40 are visible outside the flexible screen 50. The transparent protective layer 60 can be made from a transparent bendable material having certain rigidity, such as polyethylene terephthalate (PET), and it fits the flexible screen 50 to serve a protective function.

During the assembling, firstly, one of the long frames 22 can be detached from the connecting portions 24, and then the circuit board, the cell and so on are mounted to the connecting portions 24. The functional elements such as the earphone 42, the photographing means 44, the brightness sensing means 46 and so on are mounted to the first spindle 32. Subsequently, the rectangular transparent protective layer 60 in an expanded state is connected end to end smoothly, and then the rectangular flexible screen 50 similarly in an expanded state is fixed to the transparent protective layer 60 in a manner such as bonding etc., thus, the two together form a closed end-to-end strap shape, at this point, the strap is sleeved on the first spindle 32 and the second spindle 34. The two spindles expand the flexible screen 50 and the transparent protective layer 60, and the through holes 35 of the first spindle 32 are aligned with the perforations 52 of the flexible screen.

Then, one end of the first spindle 32 and the second spindle 34 are mounted to the two mounting portions 26 of the frame 20, at this point, the two spindles and the flexible screen 50 are closely joined, so that the two spindles and the flexible screen 50 can realize synchronic rotation with the help of a friction force or a concave-convex structure (not illustrated) correspondingly arranged therebetween when the transparent protective layer 60 and the flexible screen 50 move around the two spindles. The long frame 22 detached above is mounted to the connecting portions 24 to complete the assembling. The assembled electronic device 10 has a front surface 15 (the surface facing upward in FIG. 1) which is a flat surface, a rear surface 16 which is also a flat surface, and a first lateral surface 17 (the surface facing lower right in FIG. 1) and a second lateral surface 18 which are arranged opposite to connect the front surface and the rear surface and substantially have a semi-cylindrical shape.

Figure 3:
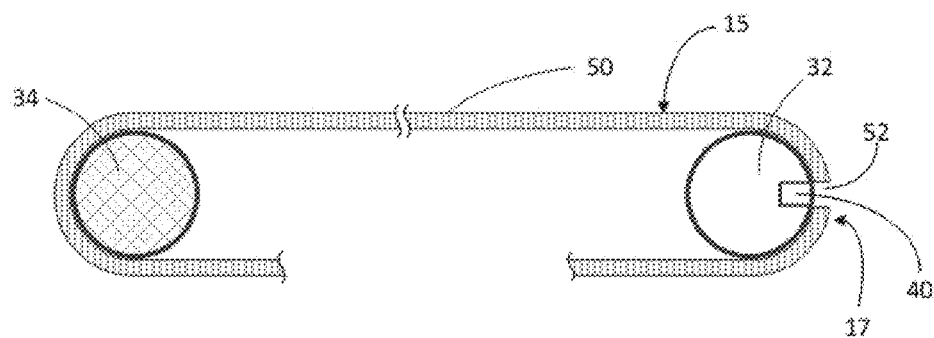
FIG. 3 is a sectional view of two spindles and the flexible screen in a first position when the electronic device of FIG. 1 is sectioned along a line III-III.
Figure 4:
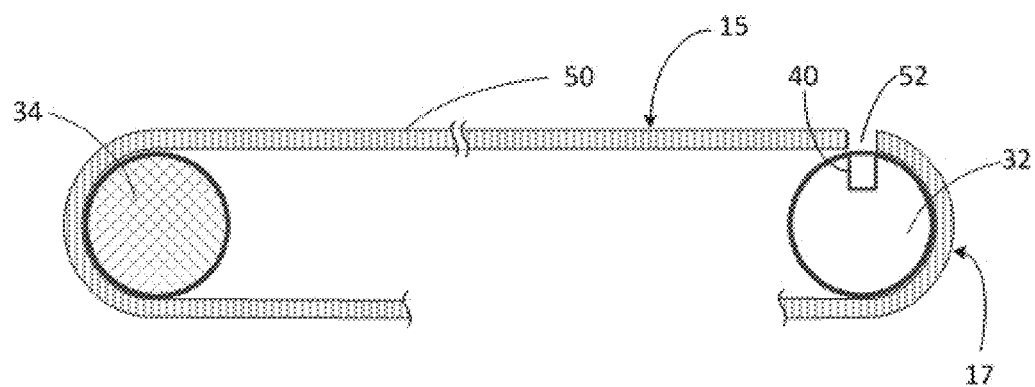
FIG. 4 is similar to FIG. 3, with a difference in that the two spindles and the flexible screen are in a second position.

Referring to FIG. 3 and FIG. 4, during operation, when a user does not need to use the functional elements 40, for example, when seeing literal contents and pictures, the first spindle 32 is rotated to the first position as illustrated by FIG. 3, that is, the functional elements 40 face the first lateral surface 17 and are preferably substantially parallel to the front surface 15, at this point, no position of the whole front surface 15 is occupied by the functional elements 40, therefore, the screen proportion of the front surface is increased. When the user needs to use the functional elements 40, for example, when talking, the first spindle 32 can be electrically or manually rotated to the second position as illustrated by FIG. 4, that is, the functional elements 40 face the front surface 15, so that the user can conveniently use the functional elements 40. However, when the user does not need to use the functional elements 40, the first spindle 32 can be manually rotated to the first position or automatically returns to the first position in an electrical manner.

In the above embodiment, the whole flexible screen 50 can be set to be capable of displaying a desired picture, that is, when at the first position, the flexible screen 50 includes a first display area, a second display area, a third display area, and a fourth display area, facing the front surface 15, the rear surface 16, the second lateral surface 18, and the first lateral surface 17, which can be used for displaying. It can be understood that an area of the flexible screen 50, when at the first position, facing the first lateral surface 17 can also be set as a non-display area, while areas facing other surfaces as display areas; alternatively, areas of the flexible screen 50, when at the first position, facing the front surface 15 and the rear surfaces 16 are display areas, while areas facing other surfaces as non-display areas; alternatively, only an area of the flexible screen 50, when at the first position, facing the front surface 15 is a display area. It shall be indicated that drive arrays and display pixels do not need to be provided in portions of the non-display areas of the flexible screen 50.

Figure 5:
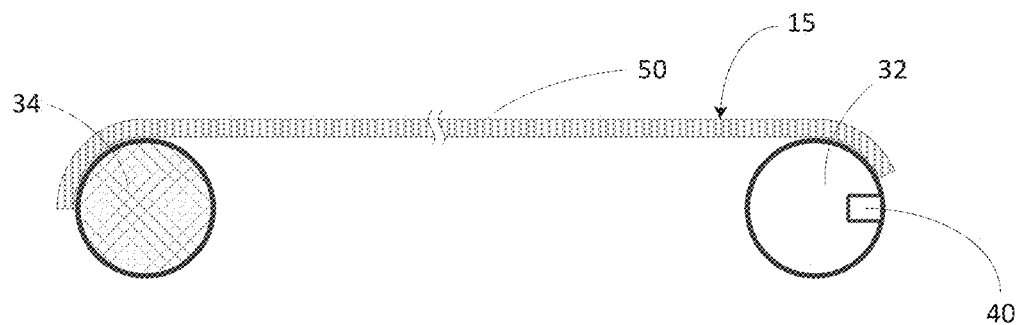
FIG. 5 illustrates a variant embodiment of the electronic device of FIG. 3.

In addition, when the area of the flexible screen 50, at the first position, facing the rear surface 16 (the second display area above) is a non-display area, the second display area above can be directly omitted, that is, the flexible screen 50 has no portion facing the rear surface, as illustrated by FIG. 5. It also shall be indicated that when the flexible screen 50 is provided in a strap shape connected end to end as mentioned above, the flexible screen 50 does not have to be connected end to end, specifically, both ends of the flexible screen 50 can be fixed to both sides of the functional elements 40 in a bonding manner and so on, and reference can be made to FIG. 3 for the structure at this point, and such structure is easy to manufacture. Like the flexible screen 50, the transparent protective layer 60 can also be discontinuous, and can also be connected end to end as the above embodiment.

Preferably, referring to FIG. 1 and FIG. 2, earphones 48 of the electronic device 10 are provided on two axial end surfaces of the second spindle 34. Thus, irrespective of the position where the second spindle 34 is rotated, and regardless of the hand of the user holding the electronic device 10 for talking, voices can be better picked up by the electronic device 10 through any earphone 48.

Figure 6:
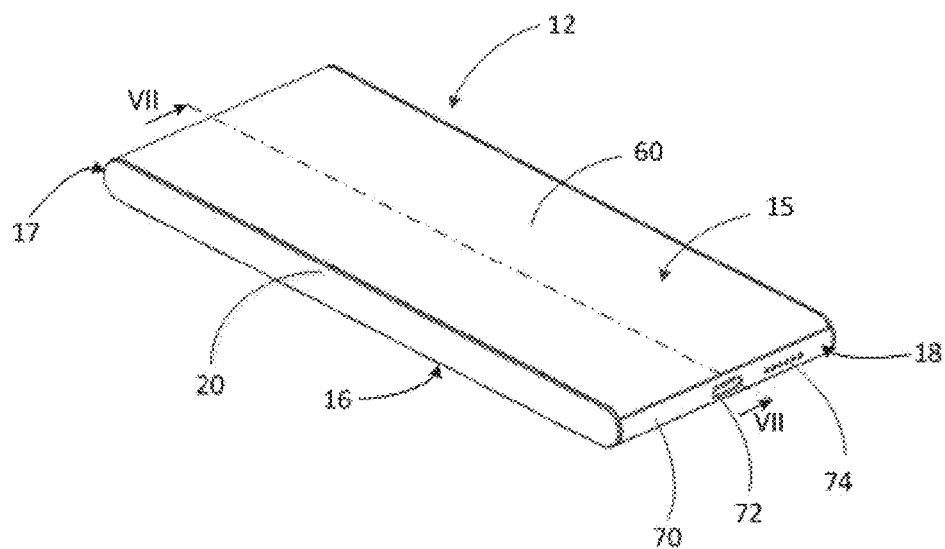
FIG. 6 is a schematic view of an electronic device having a flexible screen in accordance with another embodiment of the present disclosure.
Figure 7:
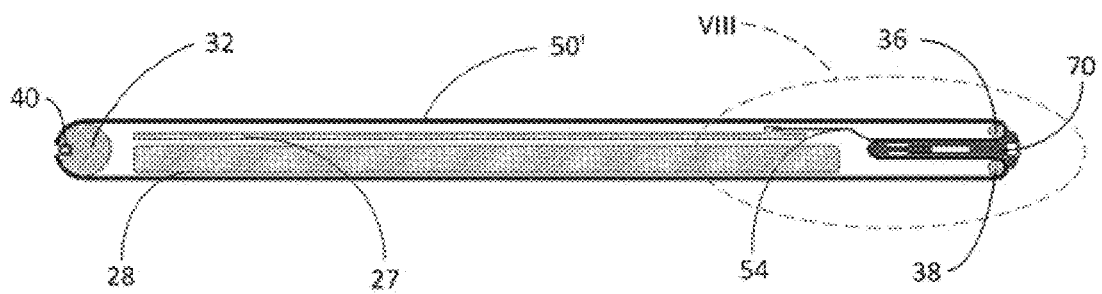
FIG. 7 is a sectional view of the electronic device of FIG. 6 along a line VII-VII.
Figure 8:
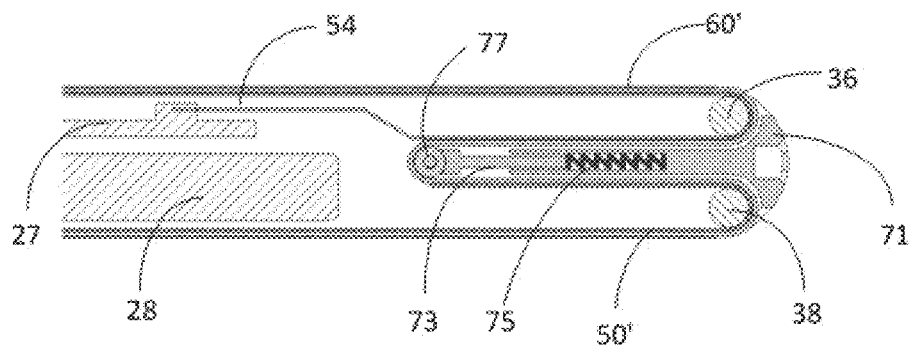
FIG. 8 is an enlarged view of a portion VIII of FIG. 7.

FIG. 6 to FIG. 8 are schematic views of an electronic device 12 in accordance with a second embodiment of the present disclosure. It is different from the electronic device 10 of the first embodiment in that a third spindle 36 and a fourth spindle 38 are used to replace the second spindle 34 and that an input/output module (I/O module) 70 located at the second lateral surface 18 is added. Specifically, the third spindle 36 and the fourth spindle 38 are respectively located at sides of the second lateral surface 18 close to the front surface and the rear surface. Lengths of a flexible screen 50' and a flexible protective layer 60' are longer than those in the first embodiment, and at this point, unlike the first embodiment, the frame 20 can have an integrated structure, and the flexible screen 50' and the flexible protective layer 60' can be conveniently sleeved on the first to third spindles 32, 36 and 38. The flexible screen 50' is likewise connected to the circuit board 27 through a flexible circuit board 54, and the circuit board 27 is connected to a cell 28. The I/O module 70 is inserted between the third spindle 36 and the fourth spindle 38 and presses against the flexible protective layer 60', so that the flexible screen 50' is recessed toward the inside of the electronic device 12, and its surfaces facing the front surface and the rear surface are flat surfaces. The I/O module 70 has an interface 72 exposed from the second lateral surface 18, and certainly, there may be also a loudspeaker 74. The I/O module 70 can be fixed to the frame 20 by a fixing structure (not illustrated) provided on the long frame, such as a screw, a snap fastener and so on, and can be connected to the circuit board 27 by a wire (not illustrated) provided on the long frame.

Preferably, referring to FIG. 8, the I/O module 70 includes a body 71 provided with the interface 72, a slide rod 73 partially received in the body 71, a spring 75 pressing against the body 71 and the slide rod 73, and a fifth spindle 77 rotatably fixed to the slide rod 73. When the I/O module 70 is inserted and fixed to the frame 20, the fifth spindle 77 presses against the flexible protective layer 60'. Such manner of arrangement can reduce the accuracy of manufacturing and processing the I/O module 70, and also can allow the flexible screen 50' and the flexible protective layer 60' to be deformed to a certain degree.

Figure 9:
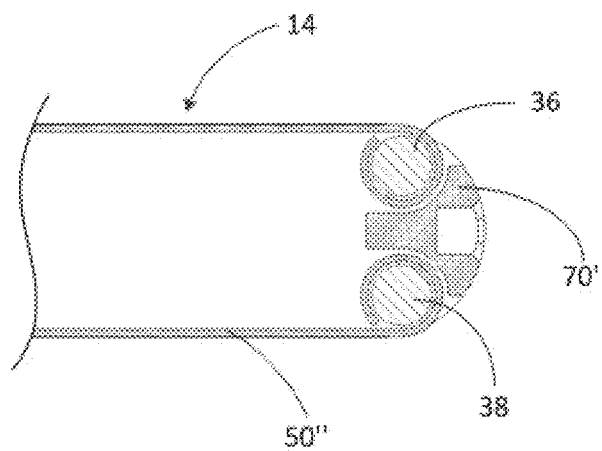
FIG. 9 is a partial sectional view of an electronic device having a flexible screen in accordance with yet another embodiment of the present disclosure, a transparent protective layer being removed.

Referring to FIG. 9, an electronic device 14 in accordance with a third embodiment of the present disclosure is different from the electronic device 12 of the second embodiment in a flexible screen 50" and an I/O module 70'. Specifically, the flexible screen 50" is not in a closed strap shape, and two terminal ends of the flexible screen" are wound to the third spindle 36 and the fourth spindle 38, respectively. At this time, the I/O module 70' does not need to be provided with the above slide rod 73, the spring 75, and the fifth spindle 77, either. During the assembling process, firstly, the two terminal ends of the flexible screen 50" can be wound to the third spindle 36 and the fourth spindle 38, respectively, and then assembled to the frame 20. Such a manner saves the process of forming the flexible screen into a closed strap shape, and also facilitates the assembling of the whole electronic device 14.

It can be seen from the above various embodiments that the above object of increasing the screen proportion can be realized as long as the first spindle 32 of the electronic device is rotatably provided at the first lateral surface 17 and can be rotated between the first position and the second position; the flexible screens 50, 50' and 50" are bent around the first spindle 32 and can move as the first spindle 32 is rotated; and the functional elements 40 are provided at the first spindle 32, so that the functional elements 40 face the front surface 15 at the first position and the functional elements 40 face the first lateral surface 17 at the second position.

In the above various embodiments, the frame 20 also can have a protective layer such as a glass provided on the front surface 15, at this point, it may be unnecessary to provide the transparent protective layer 60. In addition, when a portion of the flexible screen covering the functional elements is transparent, it may be unnecessary to provide the perforations 52, too. It shall be indicated that when a portion of the flexible screen facing the first lateral surface does not need to display, the flexible screen does not need to cover the functional elements, either, as illustrated by FIG. 5, at this point, the functional elements 40 likewise are visible from the flexible screen. Besides, when the flexible screens of the electronic devices of various embodiments have display areas facing the front surface and the rear surface, the second spindle 34 also can be provided with the functional elements 40 as the first spindle 32, as illustrated by a dash line on the second spindle 34 in FIG. 2, and when located at the second position, the functional elements on the two spindles respectively face the front surface and the rear surface. Thus, the user can conveniently answer the electronic device regardless of which surface faces upward when the user picks up the electronic device.

The above-mentioned are merely for preferable embodiments of the present disclosure and not used to limit the present disclosure. Any modifications, equivalent substitutions, improvements and so on, made within the spirit and principle of the present disclosure, shall be covered by the protection scope of the present disclosure.

What is claimed is:

1. An electronic device having a flexible screen, having a front surface, a rear surface opposite to the front surface, and a first lateral surface connecting the front surface and the rear surface, the electronic device comprising:
a first spindle rotatably provided at the first lateral surface and able to be rotated between a first position and a second position;
the flexible screen bent around the first spindle and able to move as the first spindle is rotated; and
a functional element provided at the first spindle, at the first position, the functional element being exposed from the first lateral surface so that the functional element is visible from the first lateral surface; at the second position, the functional element being exposed from the front surface so that the functional element is visible from the front surface.

2. The electronic device of claim 1, wherein the flexible screen comprises a first display area and a non-display area located laterally to the first display area, and the functional element is visible when viewed from the non-display area.

3. The electronic device of claim 2, wherein at the first position, the first display area faces the front surface, and the non-display area faces the first lateral surface; at the second position, the first display area is partially moved out of the front surface, and the non-display area is at least partially moved to the front surface.

4. The electronic device of claim 1, wherein the electronic device further comprises a second spindle arranged opposite to the first spindle; the flexible screen is bent around the second spindle after extending from the first spindle to the second spindle, and is also movable as the second spindle is rotated.

5. The electronic device of claim 4, wherein the flexible screen further comprises a second display area extending between the first spindle and the second spindle, and at the first position, the second display area faces the rear surface.

6. The electronic device of claim 4, wherein the flexible screen further comprises a third display area connected to the first display area; at the first position, a portion of the second spindle is covered by the third display area.

7. The electronic device of claim 6, wherein the flexible screen further comprises a fourth display area connected to the first display area, and at the first position, a portion of the first spindle is covered by the fourth display area.

8. The electronic device of claim 1, wherein the electronic device further comprises a second spindle arranged opposite to the first spindle, the flexible screen is further bent around the second spindle, and continuously extends around the first spindle and the second spindle.

9. The electronic device of claim 8, wherein the flexible screen is able to display an image in both directions of extending around the first spindle and the second spindle.

10. The electronic device of claim 9, wherein the electronic device further comprises a second functional element provided on the second spindle, when at the second position, the functional element and the second functional element respectively face the front surface and the rear surface.

11. The electronic device of claim 1, wherein both ends of the flexible screen are located at both opposite sides of the functional element, or the flexible screen is provided with a perforation or a transparent portion thereof at a position corresponding to the functional element, and the functional element comprises a microphone, a photographing means, a brightness sensing means, a distance sensing means, or a combination thereof.

12. The electronic device of claim 1, wherein the electronic device further comprises a second lateral surface arranged opposite to the first lateral surface, the electronic device further comprises a third spindle and a fourth spindle rotatably provided at both opposite sides of the second lateral surface, and the flexible screen is bent around the third spindle and the fourth spindle.

13. The electronic device of claim 12, wherein the electronic device further comprises an input/output module fixed between the third spindle and the fourth spindle, and the input/output module comprises an interface exposed from the second lateral surface.

14. The electronic device of claim 13, wherein the flexible screen continuously extends between the third spindle and the fourth spindle, and is pressed against by the input/output module to be recessed toward the inside of the electronic device between the third spindle and the fourth spindle.

15. The electronic device of claim 14, wherein the input/output module comprises a body provided with the interface, a fifth spindle, and an elastic element located between the body and the fifth spindle, the fifth spindle presses against the flexible screen to recess to the inside of the electronic device away from the side of the second lateral surface, and the elastic element is in a compressed state.

16. The electronic device of claim 12, wherein the flexible screen comprises a first terminal end and a second terminal end respectively wound to the third spindle and the fourth spindle, and a portion of the flexible screen bent around the first spindle is located between the first terminal end and the second terminal end.

17. The electronic device of claim 16, wherein the electronic device further comprises an input/output module fixed between the third spindle and the fourth spindle, the input/output module comprises an interface exposed from the second lateral surface.

18. The electronic device of claim 1, wherein the front surface is a flat surface, and the first lateral surface is a curved surface.

19. An electronic device comprising:
a first spindle capable of rotating between a first position and a second position;
a second spindle capable of rotating between the first position and the second position;
a flexible screen bent around the first spindle and the second spindle, the flexible screen comprising a front surface, a first lateral surface, and a second lateral surface opposite to the first lateral surface, the front surface connected between the first and the second lateral surfaces, the first spindle provided at the first lateral surfaces, and the second spindle provided at the second lateral surface;
a functional element provided at the first spindle, at the first position, the functional element being exposed from the first lateral surface so that the functional element is visible from the first lateral surface; at the second position, the functional element being exposed from the front surface so that the functional element is visible from the front surface; and
at least one earphone provided on at least one axial end surface of the second spindle.

* * * * *